US006623852B1

(12) United States Patent
Wagner et al.

(10) Patent No.: US 6,623,852 B1

(45) Date of Patent: Sep. 23, 2003

(54) USE OF A HEAT-SENSITIVE RECORDING MATERIAL AS A LABEL

(75) Inventors: Wolfgang Wagner, Flensburg (DE); Jutta Berndt, Jarplund (DE); Bernd Gerecht, Osnabrück (DE)

(73) Assignee: Mitsubishi HiTec Paper Flensburg GmbH, Flensburg (DE)

(*) Notice: Subject to any disclaimer, the term of this patent is extended or adjusted under 35 U.S.C. 154(b) by 0 days.

(21) Appl. No.: 09/622,494

(22) PCT Filed: Feb. 13, 1999

(86) PCT No.: PCT/EP99/00964

§ 371 (c)(1),
(2), (4) Date: Aug. 17, 2000

(87) PCT Pub. No.: WO99/42298

PCT Pub. Date: Aug. 26, 1999

(30) Foreign Application Priority Data

Feb. 17, 1998 (DE) ........................................ 198 06 433

(51) Int. Cl.[7] .......................... B41M 5/20; B41M 5/24; B32B 7/12; B41F 1/08

(52) U.S. Cl. ....................... 428/354; 428/343; 503/200; 503/214; 503/226; 346/76.1; 427/152; 101/288

(58) Field of Search ................................ 503/200, 214, 503/226; 346/76.1; 428/40.1–42.3, 343; 427/152; 101/288

(56) References Cited

U.S. PATENT DOCUMENTS

| | | | | |
|---|---|---|---|---|
| 4,711,874 A | * 12/1987 | Yuyuama et al. | ........... | 503/206 |
| 4,717,709 A | 1/1988 | Suzuki | | |
| 4,833,116 A | 5/1989 | Yamori et al. | | |
| 5,658,661 A | * 8/1997 | Mitchell, Jr. et al. | ....... | 428/352 |
| 5,679,615 A | * 10/1997 | Matsumoto et al. | ........ | 503/217 |
| 5,840,657 A | * 11/1998 | Mehta et al. | ............... | 503/204 |

FOREIGN PATENT DOCUMENTS

| | | |
|---|---|---|
| DE | 39 35 070 A1 | 4/1990 |
| DE | 40 12 185 C1 | 5/1991 |
| DE | 33 12 716 C2 | 7/1991 |
| DE | 42 25 419 A1 | 2/1993 |
| DE | 197 57 589 A1 | 6/1998 |
| EP | 373 903 A2 | 6/1990 |
| EP | 159 659 B1 | 7/1990 |
| EP | 764 548 A2 | 3/1997 |
| EP | 780 241 A1 | 6/1997 |
| WO | WO 97/07985 | 3/1997 |

OTHER PUBLICATIONS

Material Property Reprints from ChemFinder.com (http://www.chemfinder.com)—Acrylic Acid, Methacrylic Acid, Methyl Acrylate, Ethyl Acrylate, Butyl Acrylate, Isobutyl Acrylate, and Methyl Methacrylate.*

* cited by examiner

*Primary Examiner*—Harold Pyon
*Assistant Examiner*—Brian P. Egan
(74) *Attorney, Agent, or Firm*—Cohen, Pontani, Lieberman & Pavane

(57) ABSTRACT

A heat-sensitive recording material, comprising a layer support, on whose front face a heat-sensitive recording layer is arranged, containing a colorant precursor and a colorant acceptor which undergoes a colorant formation reaction when it comes into contact with the colorant precursor, an intermediate layer arranged between the layer support and heat-sensitive recording layer, a protective layer that is free from compounds containing silicone, is hardened by actinic radiation and covers the heat-sensitive recording layer and a self-adhesive layer arranged on the back of the layer support, is used as a label material which can be wound on a roll and printed by the offset or flexographic printing process and in which the self-adhesive layer is in contact with the protective layer in the roll.

7 Claims, No Drawings

USE OF A HEAT-SENSITIVE RECORDING MATERIAL AS A LABEL

This is a U.S. national stage of application No. PCT/EP99/00964, filed on Feb. 13, 1999. Priority is claimed on that application and on the following application(s) Country: Germany, Application No.: 198 06 433.0, Filed: Feb. 17, 1998.

FIELD OF THE INVENTION

The present invention relates to a method for making a heat-sensitive recording material suitable for offset or flexographic printing.

DESCRIPTION OF THE PRIOR ART

German Patent No. DE-C-33 12 716 discloses a heat-sensitive recording material, which has a protective layer to limit damaging. protective layer specified there is used to limit damaging influences which act on the recording material by means of water, plasticizer, oils or organic solvents, and impair the fastness of the image density.

According to DE-A-39 35 070, a heat-sensitive recording material with a glossy surface is proposed, which has a protective layer that is hardened by actinic radiation and which is intended to exhibit an exceptional adaptability to adapt to the thermal head without causing printing failures.

DE-C-40 12 185 discloses a heat-sensitive recording material which has a protective layer arranged above the heat-sensitive recording layer and a coating on the back, both being hardened by means of electron beams. In addition, an intermediate layer that is likewise hardened by electron beams and composed of crosslinked polymers is arranged between the support material and recording layer. This intermediate layer is intended to restrict the influence of the support material on the colorant formation reaction and the contrast of the image produced with respect to the image background.

DE-A-42 25 419 discloses a heat-sensitive recording material having a covering layer which has a resin that can be hardened by ionizing radiation, there being, in the covering layer, a silicone surface active agent and microspheres of a lowmolecular olefine polymer resin. This known heat-sensitive recording material is intended to be used as a sticker, for example in a fully automatic labeling machine, the intention being, on one hand, to avoid any contamination of the recording head by components of the covering layer but, on the other hand, to continue to ensure satisfactory printability.

A method for producing a heat-sensitive layer and a protective layer to be applied to the heat-sensitive layer from the mixture of a water-soluble or water-dispersible binder which can be crosslinked by electron beams, and a prepolymer or monomer which can be hardened by electron beams, is disclosed by EP-B-0 159 659. It is indicated that the intention is to achieve better resistance to water or moisture as compared with the conventional heat-sensitive recording materials. For this purpose, the use of polysiloxane compounds is proposed.

The prior art discussed above shows that the protective layers known hitherto have previously been intended primarily to improve the chemical resistance, water resistance or plasticizer resistance. On the other hand, proposals for the use of heat-sensitive recording materials as a label are also known. Such proposals are disclosed by U.S. Pat. No. 4,717,709 and EP-A-0 373 903. These proposals are directed toward arranging the heat-sensitive labels on release paper, so that they can be wound up on rolls and presented as a roll to a thermal printer. The use of release papers makes the product more expensive overall and is therefore disadvantageous.

EP-A-0 780 241 also discloses a heat-sensitive recording material in whose protective layer a silicone component is contained. With this proposal, the intention is to achieve better behavior of the recording material at the thermal head, and to reduce the so-called fogging.

DE-A-197 57 589, which is not a prior publication, discloses a heat-sensitive recording material which has two intermediate layers applied to the heat-sensitive recording layer, namely a barrier layer and a release layer provided on the barrier layer, the release layer being mainly composed of compounds containing silicone.

WO 97/07985A1 discloses a heat-sensitive recording material which has an adhesive layer on the back and a protective layer which covers the heat-sensitive recording layer and can be crosslinked by means of ultraviolet radiation or electron beam. This known protective layer contains, in addition to a solid first component consisting of (poly) tetrafluoroethylene, a second liquid component consisting of silicone, which forms a matrix in which the first component is to be embedded. Other second components not consisting of silicone are not disclosed. If the heat-sensitive recording material is wound onto a roll, the adhesive layer on the back and the protective layer are in contact. The heat-sensitive recording material according to WO 97/07985 A1 is intended to exhibit a matte, writable surface which does not effect overly severe wear of the thermal head, adheres only slightly to the adhesive layer and cleans the thermal head in a mechanical way. Flexographic and offset printing processes are explicitly mentioned only for the printing process before the protective layer is applied. The use according to the invention of a heat-sensitive recording material having a protective layer free of silicone-containing compounds as a label material to be printed by the offset or flexographic printing process is not disclosed by WO 97/07985 A1.

The object of U.S. Pat. No. 4,833,116 is the improvement of the recording quality and the stability of the recorded image. In the true sense, this specification relates to a recording material provided for the video print process. Thus, it fails to disclose how the heat-sensitive recording material is wound onto a roll so that it can be used in an offset or flexographic printing process. In addition, the recording material disclosed in the reference has an intermediate layer which is formed on the heat-sensitive recording layer and based on an aqueous resin and is covered by a protective layer which can be hardened by electron beams and to which a fine silicone powder is added.

In order to cover an adhesive layer applied to the back of a heat-sensitive recording material, EP-A-0 764 548 provides a paper sheet (disposable sheet) for single use made of a neutral paper. The heat-sensitive recording material is intended to be used as a label. The use of recording material wound on a roll in the offset or flexographic printing process—without a paper sheet covering the adhesive layer—is not disclosed by this specification.

Heat-sensitive recording papers whose protective layer contains a silicone component have also already been used for the production of labels which can be unwound from rolls, without the additional use of release paper. In this case, the addition of silicone is intended to avoid the adhesive layer on the back bonding to the protective layer. The disadvantage which arises here is that the addition of silicone impairs the printability in flexographic and offset printing.

SUMMARY OF THE INVENTION

It is an object of the present invention to provide a heat-sensitive recording material that has a self-adhesive layer applied to its back and can be wound on a roll for being used in a thermal printer. The recording material according to the present invention uses neither a release paper nor a silicone-containing protective layer, whereby overcoming the disadvantages associated with the prior art recording materials as above discussed and producing satisfactory results when used in an offset or flexographic printing process.

The object is achieved by fabricating a novel rollable heat-sensitive recording material that comprises (a) a heat-sensitive recording layer containing a colorant precursor and a colorant acceptor capable of forming a colorant when contacting with the colorant precursor, (b) a layer support, on which the heat-sensitive recording layer is disposed, (c) an intermediate layer arranged between the layer support and the heat-sensitive recording layer, (d) a protective layer covering the heat-sensitive recording layer, which is substantially free of silicone-containing compounds and can be hardened by actinic radiation, and (e) a self-adhesive layer disposed on the back of the layer support. Then, the recording material is wound around a core or a rod, which can be solid, hollow or imaginary, and the resulting roll is ready for being used in a thermal printer.

The various feathers of novelty which characterize the invention are pointed out with particularity in the claims annexed to and forming a part of the disclosure. For a better understanding of the invention, its operating advantages, and specific objects attained by its use, references should be made to the detailed description of the preferred embodiments of this invention.

DETAILED DESCRIPTION OF THE PRESENTLY PREFERRED EMBODIMENTS

In one embodiment, the covering layer may be preferably hardened by means of ultraviolet (UV) radiation, although other means may also be satisfactorily used. If UV radiation is used, the monomers or prepolymers used to produce the covering layer must contain additions of initiators, as is known. By means of electron-beam hardening, it was possible to achieve a covering layer which is formed, i.e., hardened, particularly uniformly over its cross section.

According to the invention, the formation of the covering layer with a grammage in the range from 0.5 to 3.5 g/m$^2$ is preferred.

It is preferable for the resin component which is present in the protective layer and hardened by actinic radiation to be formed from the monomers or prepolymers of acrylate and/or methacrylate.

In addition to the photoinitiators which are already required during the hardening of the covering layer by means of UV beams, pigments and crosslinking aids may be present in a lower quantity in the covering layer; however, in every case the covering layer is free from compounds containing silicone.

It has been shown in practice that, given adequate hardening of the protective layer, bonding between the self-adhesive layer and the protective layer is insubstantial. The recording material is satisfactorily used in a thermal printer, and residues of the self-adhesive layer does not stay on the covering layer, which is in contact with the self-adhesive layer, to any significant extents that impair the printing process.

The offset printing process specified in the description and patent claims is to be understood as the wet-offset printing process. The term "actinic radiation" used the claims and the description is to be understood as ultraviolet radiation (UV) or other ionizing radiation, such as electron beams. All other specifics of the recording material of the present invention are conventional and, because they are known to people ordinarily skilled in the art, it is believed unnecessary to describe them herein.

While there have been shown, described and pointed out the features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combination of those element and/or method steps which perform substantially the same function in substantially the same way to achieve substantially the same results are within the scope of the invention.

What is claimed is:

1. A heat-sensitive label suitable for an offset or flexographic printing process, consisting of:

(a) a heat-sensitive recording layer having a colorant precursor and a colorant acceptor for forming a colorant upon contact with the colorant precursor, (b) a layer support having a front surface and a back surface, wherein said heat-sensitive recording layer is arranged on the front surface of said layer support, (c) an intermediate layer arranged between said heat-sensitive recording layer and said layer support, (d) a top layer free of compounds containing silicone, said top layer covering said heat-sensitive recording layer wherein the top layer is hardened by actinic radiation, said top layer comprising an offset or flexographic printable protective layer, and (e) a self-adhesive layer arranged on the back surface of said layer support, said layer (a)–(e) together forming a rollable labeling material.

2. The heat-sensitive labeling material of claim 1, wherein said top layer has a resin component formed from monomers or prepolymers of acrylate and methacrylate.

3. The heat-sensitive labeling material of claim 1, wherein said top layer has a resin component formed from monomers or prepolymers of acrylate or methacrylate.

4. A method of making a label from a heat-sensitive recording material layer with an offset or flexographic printable top layer, comprising the steps of:

(a) preparing a rollable recording material consisting of:

(i) a heat-sensitive recording layer having a colorant precursor and a colorant acceptor for forming a colorant upon contact with the colorant precursor, (ii) a layer support having a front surface and a back surface, wherein said heat-sensitive recording layer is arranged on the front surface of said layer support, (iii) an intermediate layer arranged between said heat-sensitive recording layer and said layer support, (iv) a top layer free of compounds containing silicone, said top layer covering said heat-sensitive recording layer wherein the top layer is hardened by actinic radiation, said top layer comprising an offset or flexographic printable protective layer, and (v) a self-adhesive layer arranged on the back surface of said layer support; and (b) winding said recording material to form a roll, where said self-adhesive layer is in contact with said top layer, said roll being suitable for an offset or flexographic printing process in which printing takes place on the top layer.

5. The method of claim 4, wherein the top layer of said rollable recording material has a resin component formed from monomers of prepolymers of acrylate and methacrylate.

6. The method of claim 4, wherein said top layer of said rollable recording material has a resin component formed from monomers or prepolymers of acrylate or methacrylate.

7. The method of claim 4, further comprising the step:

(c) subsequently printing on the top layer by one of offset and flexographic printing.

* * * * *